US006878877B1

United States Patent
Cozzi et al.

(10) Patent No.: US 6,878,877 B1
(45) Date of Patent: Apr. 12, 2005

(54) ADJUSTABLE ELECTRICAL OUTLET BOX ASSEMBLY

(75) Inventors: James S. Cozzi, West Chicago, IL (US); John E. Romer, Winfield, IL (US)

(73) Assignee: Lew Electric Fittings Company, Maywood, IL (US)

( * ) Notice: Subject to any disclaimer, the term of this patent is extended or adjusted under 35 U.S.C. 154(b) by 117 days.

(21) Appl. No.: 10/713,579

(22) Filed: Nov. 13, 2003

(51) Int. Cl.[7] .............................................. H01R 13/46
(52) U.S. Cl. .......................... 174/53; 174/57; 174/58; 220/3.7; 220/3.9; 220/3.2; 220/3.94; 220/3.4; 324/133
(58) Field of Search ............................ 174/53, 57, 58; 220/3.7, 3.9, 3.2, 3.94, 3.4; 324/133

(56) References Cited

U.S. PATENT DOCUMENTS

| | | | |
|---|---|---|---|
| 3,878,315 A | | 4/1975 | Blush |
| 4,634,015 A | * | 1/1987 | Taylor .......................... 220/3.7 |
| 4,747,506 A | | 5/1988 | Stuchilk |
| 4,927,039 A | * | 5/1990 | McNab ........................ 220/3.7 |
| 5,012,043 A | * | 4/1991 | Seymour ....................... 174/57 |
| 5,253,831 A | | 10/1993 | Theodorides |
| 5,289,934 A | | 3/1994 | Smith |
| 6,103,972 A | * | 8/2000 | Hagarty ........................ 174/53 |

* cited by examiner

Primary Examiner—Dean A. Reichard
Assistant Examiner—Anton Harris
(74) Attorney, Agent, or Firm—Niro, Scavone, Haller & Niro

(57) ABSTRACT

The present invention is directed to an adjustable electrical outlet box assembly comprising an outlet box, an electrical outlet assembly, and an adaptor. The adaptor is located between the box and the outlet assembly and is positioned at least partially within the box. The adaptor includes opposing mounting flanges and opposing outlet assembly support tabs that are displaced from the mounting flanges. The adaptor may be adjusted to different heights, relative to the outlet box, to accommodate different thicknesses for different floor or wall covering materials. Due to the offset between the adaptor mounting flanges and the outlet support tabs, the outer surfaces of the outlet assembly will lie generally in the same plane as, or slightly recessed from the plane of the mounting flanges. The resulting outlet box installation can be used with a flush mounted cover plate which protects and secures the electrical outlet assembly.

9 Claims, 2 Drawing Sheets

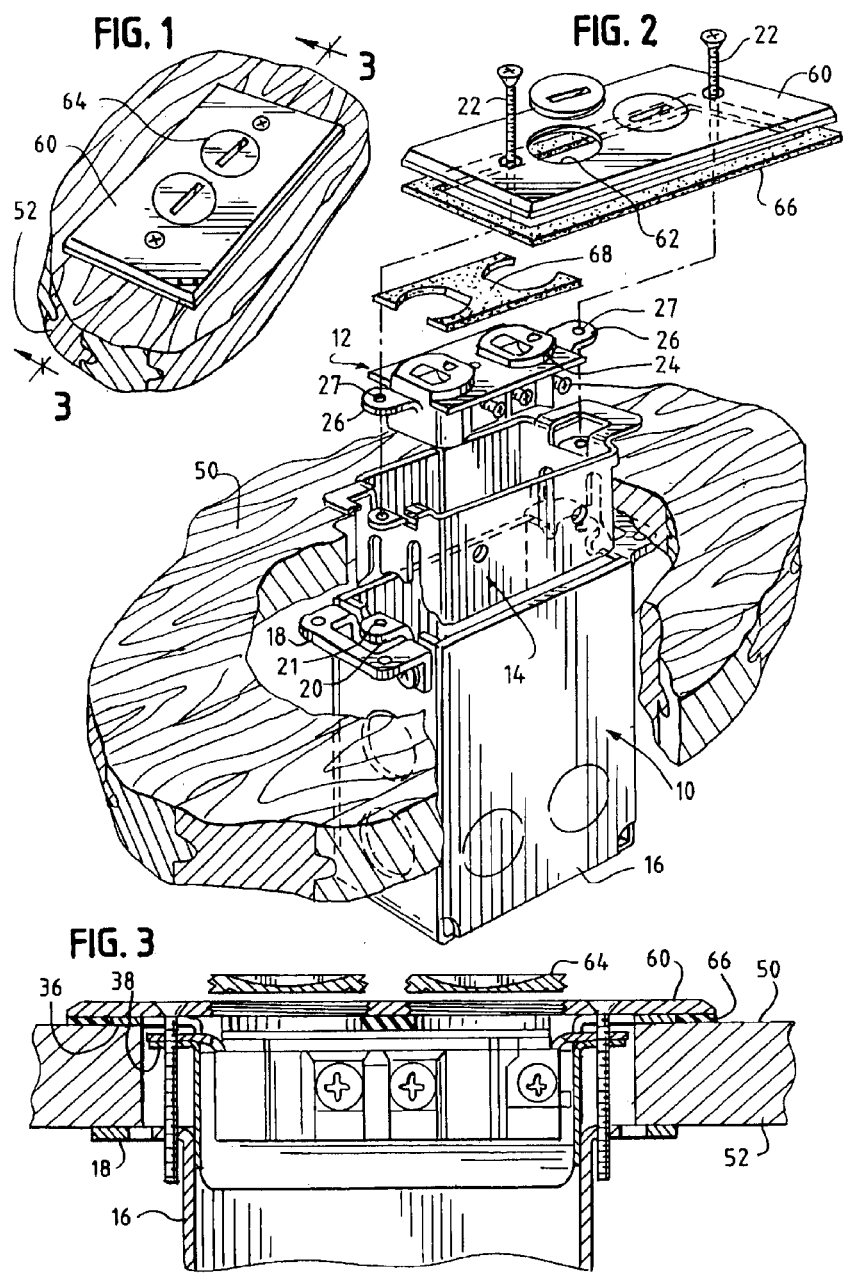

ADJUSTABLE ELECTRICAL OUTLET BOX ASSEMBLY

BACKGROUND OF THE INVENTION

The present invention relates generally to hardware for mounting electrical outlet boxes. More particularly, the invention relates to an electrical outlet box assembly including an adaptor to permit optimum placement of the electrical outlet with a variety of different floor and/or wall materials covering the box.

Various electrical outlet box assemblies having adjustability features are known in the art. Examples of prior art devices of this type as disclosed in U.S. Pat. Nos. 3,878,315; 4,747,506; 5,012,043; 5,253,831; and 5,289,934.

Despite these prior art devices, a need nonetheless exists for a simple, low cost and versatile electrical outlet box assembly that can accommodate a wide range of floor and wall covering materials. A need also exists for such an assembly that will function effectively with flush mounting cover plates that are now widely used in residential and commercial construction.

SUMMARY OF THE INVENTION

The present invention is directed to an adjustable electrical outlet box assembly comprising an outlet box, an electrical outlet assembly, and an adaptor. The adaptor is located between the box and the outlet assembly and is positioned at least partially within the box. The adaptor includes opposing mounting flanges and opposing outlet assembly support tabs that are displaced from the mounting flanges. The adaptor may be adjusted to different heights, relative to the outlet box, to accommodate different thicknesses for different floor or wall covering materials. Due to the offset between the adaptor mounting flanges and the outlet support tabs, the outer surfaces of the outlet assembly will lie generally in the same plane as, or slightly recessed from the plane of the mounting flanges. The resulting outlet box installation can be used with a flush mounted cover plate which protects and secures the electrical outlet assembly.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is a perspective view showing a finished floor installation of an electrical outlet box with assembled cover plate wherein the outlet box is mounted using one embodiment of the present invention;

FIG. 2 is an exploded perspective view of an electrical outlet box assembly using one embodiment of the present invention;

FIG. 3 is a cross-sectional view taken along line 3—3 of FIG. 1;

DETAILED DESCRIPTION OF THE PREFERRED EMBODIMENTS

Figure 4:
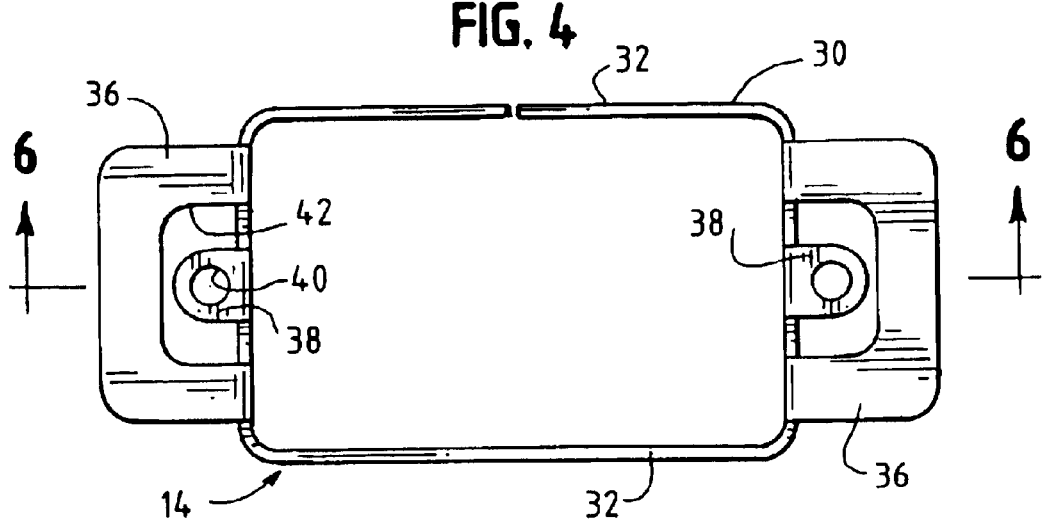
FIG. 4 is a top view of an adaptor utilized in one of the preferred embodiments of the present invention.

With reference to FIGS. 1–3, the outlet box assembly of the present invention is shown to include an outlet box 10, an outlet assembly 12, and an adaptor 14. The outlet box 10 is a conventional component in all respects and includes a four-sided housing 16 which may be mounted to or with any suitable support (floor joists, sub flooring, wall studs, etc.) by means well know in the art, such as flanges 18. The box 10 also includes opposed end tabs 20 having threaded apertures 21 for engagement with assembly screws 22. Likewise, the outlet assembly 12 is a conventional component in all respects, having one, two, or, in some cases, several individual electrical outlets 24. The outlets 24 are illustrated as conventional power outlets, but they may take other forms suitable for data and/or communications transmission. The outlet assembly 12 also includes mounting ears 26 having apertures 27 which align with the box tab apertures 21 in a manner well known in the art. Notably, the individual outlets 24 extend outwardly a short distance from the plane of the outlet assembly mounting ears 26.

Figure 5:
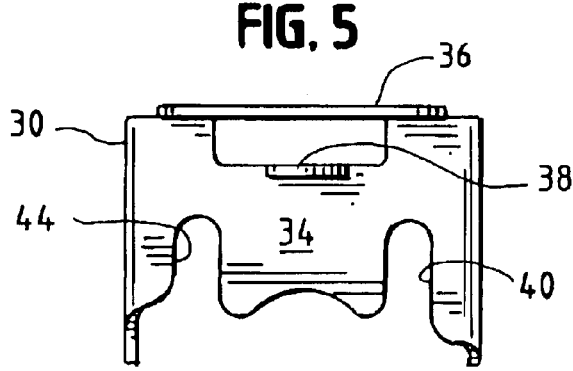
FIG. 5 is an end view of the adaptor shown in FIG. 4.

In accordance with a preferred embodiment of the present invention, the adaptor 14 is assembled between the outlet box 10 and outlet assembly 12. The adaptor 14 is illustrated in greater detail in FIGS. 4–6 and is preferably formed as a four-sided, thin walled insert 30. Insert 30 has sidewalls 32, end walls 34, two opposing loop flanges 36, and two opposing adaptor tabs 38. Each of the tabs 38 includes an aperture 40, and the loop flanges 36 define openings 42. The tabs 38 are displaced or offset from the flanges 36 along the end walls 34. Thus, the adaptor tabs 38 are sized and positioned to support the mounting ears 26 of the outlet assembly 12 in a plane offset from the plane of the insert flanges 36. As clearly illustrated in FIG. 6, the flanges 36 extend laterally beyond the free ends of tabs 38. The insert end walls 34 also have a pair of slots 44 which provide clearance between the insert 30 and small mounting screws typically used to assemble the box flanges 18 onto the ends of the box 10.

Figure 6:
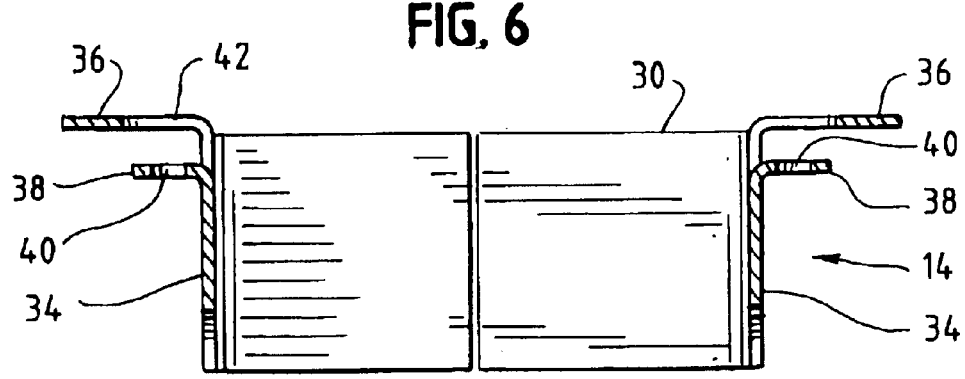
FIG. 6 is a cross-sectional view taken along line 6—6 of FIG. 4.

As illustrated most clearly in FIGS. 3 and 6, the flanges 36 are formed at the extremity of the insert 30 which is located outside outlet box 10 when the device is fully assembled. Moreover, the flanges 36 are the outermost part of the insert 30.

The adaptor 14 may be fabricated from sheet metal or any number of different plastic materials all well known to those of skill in the art. It is sized to have a slide fit within housing 16 of outlet box 10. The adaptor allows the outlet assembly 12 to be positioned precisely so that the outer surfaces of the outlets 24 are located in generally the same plane as the outer surface 50 of the floorboards 52 (or any other covering panel or structure employed with the particular installation). Alternatively, the adaptor may be configured to position the outer surfaces of the outlets 24 so as to be recessed from the outer surface of the covering member.

Use of the adaptor 14 as just described facilitates the use of a flush mounted cover plate 60 to protect the receptacle assembly 12 and reduce the likelihood of unintended contact with the power and/or data transmission lines. To this end, the cover plate 60 has threaded apertures 62 that receive threaded inserts 64 to completely cover and close off the outlets 24. In addition, a cover gasket 66 and outlet assembly gasket 68 may be employed to reduce the ingress of moisture or other contaminants into the outlet box assembly.

It will be appreciated by those skilled in the art, that covering materials (flooring, wallboard, etc.) with widely varying thickness may be used with the preferred embodiment of the present invention. The minimum thickness of suitable covering materials will be defined by the degree of offset between adaptor flanges 36 and adaptor tabs 38, while the maximum thickness of suitable covering materials will be defined by the depth of insert 30.

It will be appreciated by those skilled in the art that various changes and modifications can be made to the illustrated embodiments without departing from the spirit of the present invention. All such modifications and changes are intended to be covered by the appended claims.

We claim:

1. An electrical outlet box assembly comprising:

an outlet box;

an outlet assembly; and an adaptor located between the outlet box and the outlet assembly, the adaptor including an insert positioned at least partially within the outlet box and having a pair of opposing mounting flanges and a pair of opposing outlet assembly support tabs, said mounting flanges being located at the extremity of the insert outside the outlet box, and said support tabs being displaced from the mounting flanges to locate the outer surface of the outlet assembly in generally the same plane as, or slightly recessed from, the plane of the mounting flanges.

2. The electrical outlet assembly of claim 1 wherein said adaptor comprises a four-sided insert.

3. The electrical outlet assembly of claim 2 wherein said insert has opposing end walls each having one or more slots to accommodate assembly hardware on the outlet box.

4. The electrical outlet assembly of claim 1 further comprising a cover plate.

5. The electrical outlet box assembly of claim 4 wherein said box is mounted with a construction member having an outer surface and wherein said cover plate is located on the outer surface of said construction member.

6. The electrical outlet assembly of claim 5 wherein a gasket is positioned between the cover plate and the outer surface of the construction member.

7. The electrical outlet assembly of claim 1 wherein said mounting flanges are loop shaped to thereby define an opening to accommodate positioning of the outlet assembly relative to the insert support tabs.

8. The electrical outlet assembly of claim 4 further comprising a gasket positioned adjacent the cover plate.

9. The electrical outlet assembly of claim 8 wherein the cover plate includes at least one threaded aperture providing access to the outlet assembly and a threaded insert for closing the aperture.

\* \* \* \* \*